Patented June 30, 1936

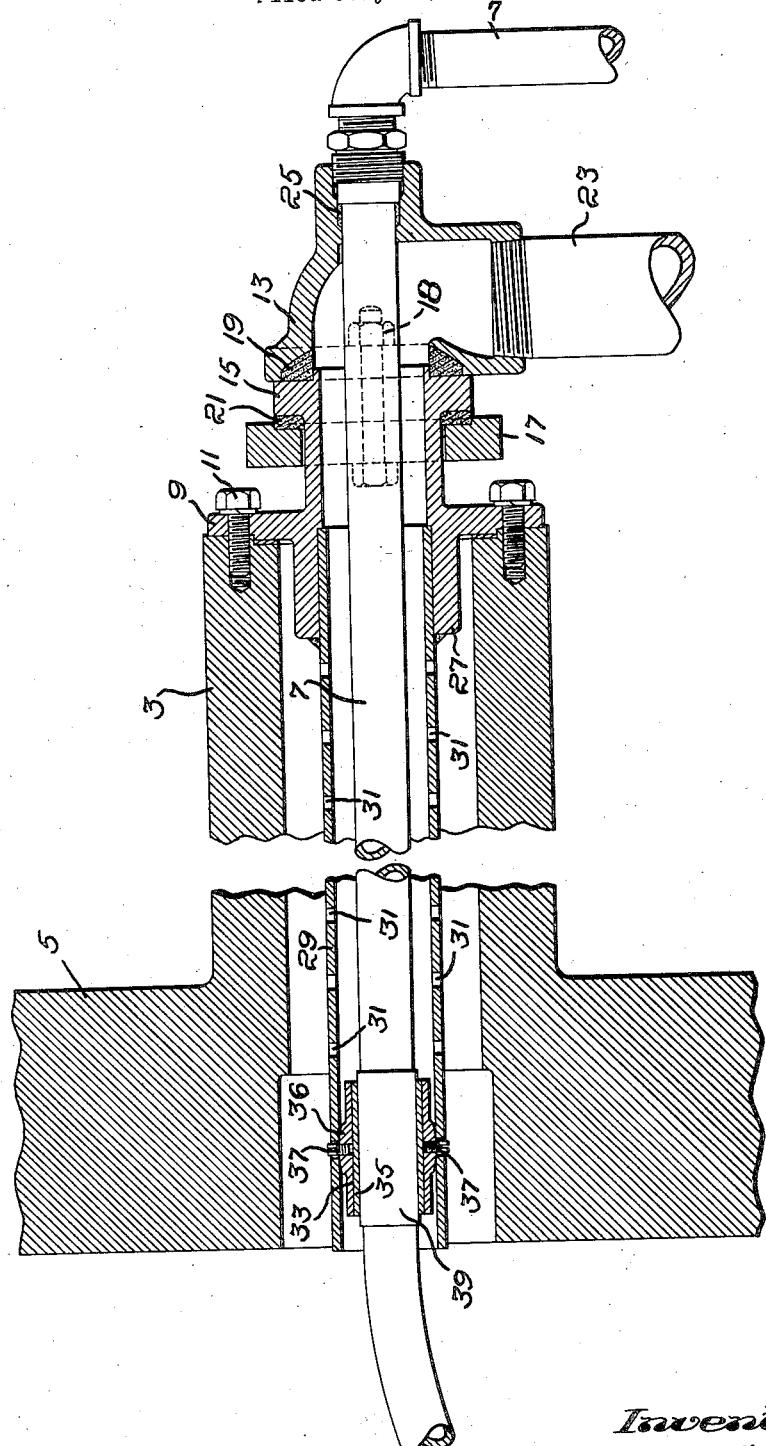

2,045,634

UNITED STATES PATENT OFFICE 2,045,634

MOUNTING OF SIPHON PIPES AND THE LIKE

Hervey G. Cram, Boston, Mass.

Application July 14, 1934, Serial No. 735,236

4 Claims. (Cl. 285—10)

The object of this invention is to provide an improved construction for supporting in connection with a rotary cylinder or drum a stationary pipe entering therein substantially at the axis of rotation, such, for example, as the eduction pipe or "siphon" for evacuating water of condensation commonly used in connection with the drying cylinders of paper machines.

My invention will be well understood by reference to the following description of an illustrative embodiment thereof taken in connection with the accompanying drawing which is a broken longitudinal section through the trunnion of a paper drying cylinder equipped with a construction exemplifying the invention.

In the drawing I show at 3 one of the trunnions rotatably supporting a hollow cylinder, a portion of the end wall of which is shown at 5. Through this trunnion steam is admitted to heat the cylinder and an eduction pipe 7 or siphon is entered therethrough to carry away water of condensation. This pipe does not rotate with the cylinder and its inner end extends downwardly toward the bottom of the cylinder in the customary manner.

A fitting 9 is here shown secured to the end of the trunnion by the bolts 11 and cooperates with a relatively stationary fitting 13 to provide a rotary joint, the fitting 9 being here shown as provided with a flange 15 pressed toward the stationary fitting 13 by means of the packing collar 17 and bolts 18, a friction disc 19 of the ball type being interposed between fitting 13 and flange 15 and a friction disc 21 between the said flange and the collar 17. Steam enters the stationary fitting 13 through pipe 23 and flows through the rotary fitting 9 to the hollow trunnion. The siphon pipe 7 may enter fitting 13 substantially axially of the cylinder through the packing box 25. The construction which has been so far described does not differ essentially from devices which have been previously known.

In accordance with my invention I provide a support for the pipe 7 inwardly remote from the stuffing box 25 for supporting the overhanging end of the pipe substantially centrally in the trunnion 3 and thus accurately locating the end of the down-turned leg within the cylinder. The fitting 13 which is secured to the cylinder is herein formed with an inwardly extending annular flange 27 carrying in overhung relation thereto an inwardly extending support, herein shown as a tube 29 of smaller dameter than the bore of the trunnion welded into the flange. The wall of the tube is pierced at intervals with openings 31 providing ports for the passage of the steam from pipe 23 to the interior of the cylinder. Adjacent the distal end of the support 29 and herein substantially at the inner wall of the cylinder 3 is carried a journal bearing 33 for the pipe 7. I use the words "journal bearing" but to avoid momentary misunderstanding I here emphasize that the pipe 7 is stationary and that the bearing 33 rotates with the tube 29 which turns with the cylinder 5.

Herein the bearing 33 takes the form of a suitable casing having an interior lining 35 of bearing-forming material. The back of the casing may be provided with a rounded circumferential rib 36 presented to the interior of the tube 29 and providing for a slight rocking movement of the bearing permitting self-alignment of the parts. Herein the bearing is positioned by screws 37 passing loosely through holes in the tubular support 29 and tapping into said rib. The pipe 7 is ordinarily of brass or the like and I may provide thereon a sleeve 39 of so-called stainless steel or other suitable material adapted to cooperate with the bearing 33.

It will be apparent from the drawing that the pipe 7 is supported at widely separated points by the stuffing box 25 and by the bearing 33, which latter is overhung by a solid and rigid connection from the fitting 9 at the end of the trunnion. The pipe is thus centered within the cylinder; the tendency of the weight of the overhanging or depending end of the pipe within the cylinder to deflect the same is adequately resisted and this depending end is accurately and securely positioned. It will be apparent that by removing the bolts 11, the fitting 9, the support 29 carried thereby and the bearing 33 may be withdrawn bodily from the end of the trunnion together with the siphon pipe 7 when desired.

I am aware that the invention may be embodied in other specific forms without departing from the spirit or essential attributes thereof, and I therefore desire the present embodiment to be considered in all respects as illustrative and not restrictive; reference being had to the appended claims rather than to the foregoing description to indicate the scope of the invention.

I claim:

1. A construction for supporting a stationary pipe in position extending through the trunnion of a rotating cylinder comprising a fitting for removable attachment to the trunnion at the outer end thereof to rotate therewith, an inwardly extending support overhung therefrom in spaced relation to the inner wall of the trunnion at a point remote from the outer end thereof, and a journal bearing for supporting the pipe with relative rotation therebetween, said bearing being carried by the support adjacent the distal end thereof.

2. A construction for supporting a stationary pipe in position extending through the trunnion of a rotating cylinder comprising a fitting for removable attachment to the trunnion at the outer end thereof to rotate therewith, a perforate tube extending inwardly therefrom to a remote point, a journal bearing for supporting the pipe with relative rotation therebetween, said bearing being carried at the inner end of the tube in spaced relation to the inner wall of the trunnion, said fitting, tube and bearing being bodily withdrawable as a unit.

3. A construction for supporting a stationary pipe in position extending through the trunnion of a rotating cylinder comprising a fitting for removable attachment at the outer end of the trunnion to rotate therewith, a support overhung therefrom in spaced relation to the inner wall of the trunnion and extending into the trunnion to a point remote from the outer end thereof, said support presenting lateral ports and a journal bearing for supporting the pipe with relative rotation therebetween, said bearing being rockingly supported adjacent the distal end of the support.

4. A construction for supporting a stationary pipe in position extending through the trunnion of a rotating cylinder comprising a fitting for attachment to the trunnion of the cylinder to rotate therewith, a cooperating, relatively stationary fitting providing a rotary joint therewith, means for supporting a pipe in the latter fitting and a journal bearing for said pipe providing for support thereof with relative rotation between pipe and bearing, said bearing being positioned within the trunnion supported at a point remote from the outer end thereof and in overhung relation from said first fitting and spaced from the inner wall of the trunnion.

HERVEY G. CRAM.